(12) United States Patent
Miyata

(10) Patent No.: US 9,276,992 B2
(45) Date of Patent: Mar. 1, 2016

(54) SERVER, IMAGE PROCESSING DEVICE, AND SYSTEM COMPRISING IMAGE PROCESSING DEVICE AND SERVER

(71) Applicant: Yuji Miyata, Kitanagoya (JP)

(72) Inventor: Yuji Miyata, Kitanagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 211 days.

(21) Appl. No.: 14/169,836

(22) Filed: Jan. 31, 2014

(65) Prior Publication Data

US 2014/0280772 A1    Sep. 18, 2014

(30) Foreign Application Priority Data

Mar. 12, 2013  (JP) .................................. 2013-049089

(51) Int. Cl.
G06F 15/16   (2006.01)
H04L 29/08   (2006.01)
H04N 1/00    (2006.01)

(52) U.S. Cl.
CPC ............ *H04L 67/02* (2013.01); *H04N 1/00244* (2013.01); *H04N 1/00954* (2013.01); *H04N 2201/0094* (2013.01)

(58) Field of Classification Search
None
See application file for complete search history.

(56) References Cited

U.S. PATENT DOCUMENTS

| 6,748,534 B1* | 6/2004 | Gryaznov | ............. | G06F 21/564 |
| | | | | 713/188 |
| 2002/0147908 A1* | 10/2002 | Miyamoto | ............ | H04L 63/083 |
| | | | | 713/168 |

FOREIGN PATENT DOCUMENTS

JP    2005-269250 A    9/2005

* cited by examiner

*Primary Examiner* — Brian P Whipple
(74) *Attorney, Agent, or Firm* — Scully, Scott, Murphy & Presser, PC

(57) ABSTRACT

A server may receive a plurality of target data transmitted by the image processing device. The plurality of target data may be data on which data processing is to be executed. The server may generate a plurality of target data identification information for identifying each of the plurality of target data. The server may store one item of association information corresponding to the plurality of target data identification information in a storage unit and transmit the one item of association information to the image processing device. The server may receive the one item of association information and data processing execution instruction information transmitted by the image processing device. The data processing execution instruction information may be for instructing execution of the data processing on the target data. The server may execute the data processing on the target data identified by the one item of association information.

12 Claims, 10 Drawing Sheets

FIG. 1
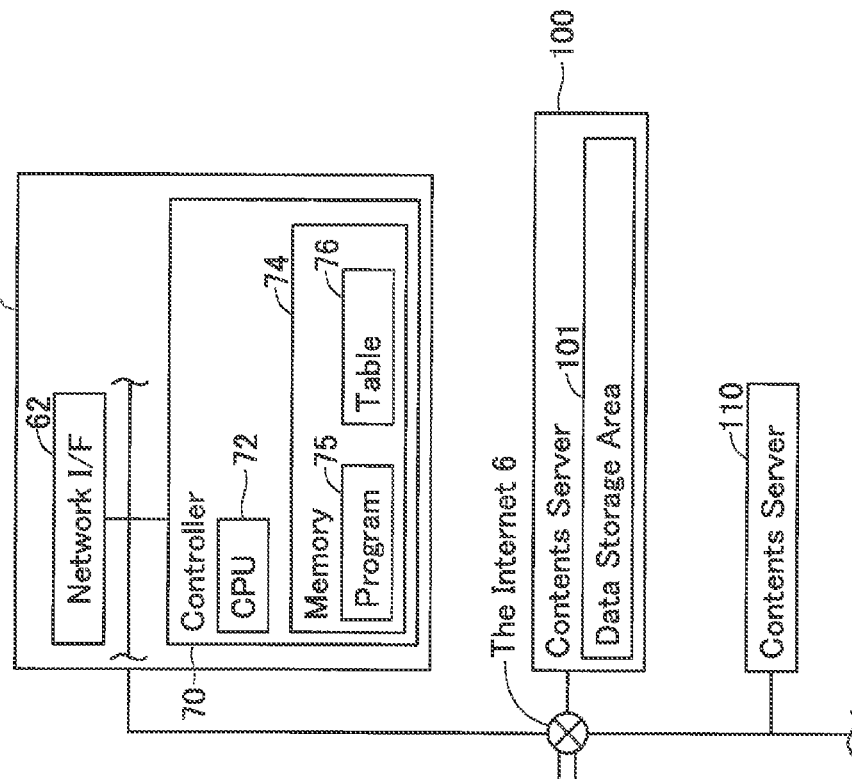
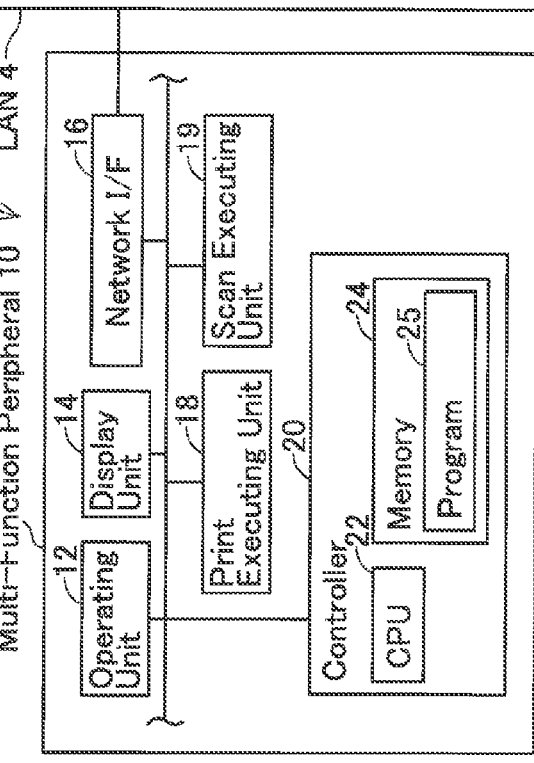
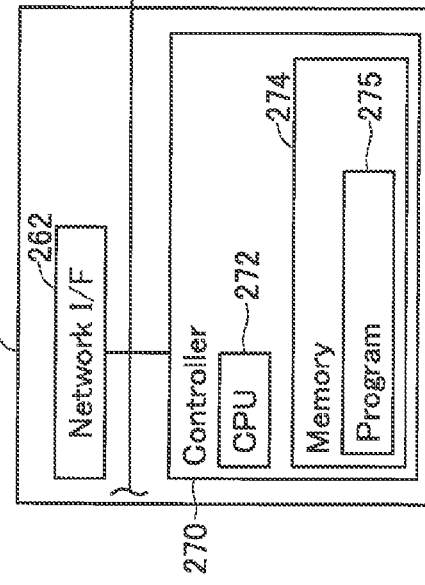

| Identification Number | Association Information | Conversion Upload Data ID | | | |
|---|---|---|---|---|---|
| 1 | FileListXXXX | FileAAA, FileBBB, FileCCC, FileDDD, FileEEE | | | |
| 2 | FileListYYYY | FileFFF, | FileGGG, | FileHHH | |
| ... | ... | | ... | | |

| Identification Number | Association Information | Conversion Upload Data ID | |
|---|---|---|---|
| 1 | FileListXXXX-1 | FileAAA-1 | FileBBB-1 |
| 2 | FileListXXXX-2 | FileAAA-2 | FileBBB-2 |
| ... | ... | ... | |

| Identification Number | Association Information | Conversion Upload Data ID |
|---|---|---|
| 1 | FileListXXXX | FileAAA-1, FileAAA-2 |
| 2 | FileListYYYY | FileBBB-1, FileBBB-2 |
| 3 | FileListZZZZ | FileAAA-1, FileAAA-2, FileBBB-2 |
| ... | ... | ... |

R21, R22, 76, R24, R25, R26, R23

SERVER, IMAGE PROCESSING DEVICE, AND SYSTEM COMPRISING IMAGE PROCESSING DEVICE AND SERVER

CROSS-REFERENCE TO RELATED APPLICATION

This application claims priority to Japanese Patent Application No. 2013-049089, filed on Mar. 12, 2013, the contents of which are hereby incorporated by reference into the present application.

TECHNICAL FIELD

The present specification discloses a server connected with an image processing device and a server via a network.

DESCRIPTION OF RELATED ART

A system is known in which an image processing device and a server capable of executing various types of processing are connected via a network. Further, a system is known in which the server executes various types of processing on data transmitted from the image processing device to the server.

SUMMARY

It may be necessary for the image processing device to store identification information for identifying data which is to undergo data processing. In this case, as a number of data which is to undergo data processing increases, an amount of information of the identification information stored by the image processing device also increases, and consequently there is a risk of occupying majority of capacity of a storage unit of the image processing device.

In one aspect of the teachings disclosed herein, a server may be provided. The server may comprise a network interface configured to connect with a network, a processor coupled to the network interface, and a memory storing instructions. The storing instructions, when executed by the processor, may cause the server to perform receiving, via the network interface, a plurality of target data transmitted by a image processing device which is connected with the network. The plurality of target data may be data on which data processing is to be executed. The instructions may cause the server to perform generating a plurality of target data identification information for identifying each of the plurality of target data. The instructions may cause the server to perform storing one item of association information corresponding to the plurality of target data identification information in a storage unit provided in the server and transmitting the one item of association information to the image processing device via the network interface in a case that the target data identification information is generated. The instructions may cause the server to perform receiving, via the network interface, the one item of association information and data processing execution instruction information transmitted by the image processing device. The data processing execution instruction information may be for instructing execution of the data processing on the target data identified by the target data identification information corresponding to the one item of association information. The instructions may cause the server to perform executing the data processing on the target data identified by the target data identification information corresponding to the one item of association information from among the plurality of target data received by the receiving of the plurality of target data, in a case that the one item of association information and the data processing execution instruction information is received.

BRIEF DESCRIPTION OF THE DRAWINGS

FIG. 1 shows the configuration of a communication system;
FIG. 12 shows an example of a table;
and
FIG. 13 shows another example of a table.

EMBODIMENT

System Configuration

Figure 2:
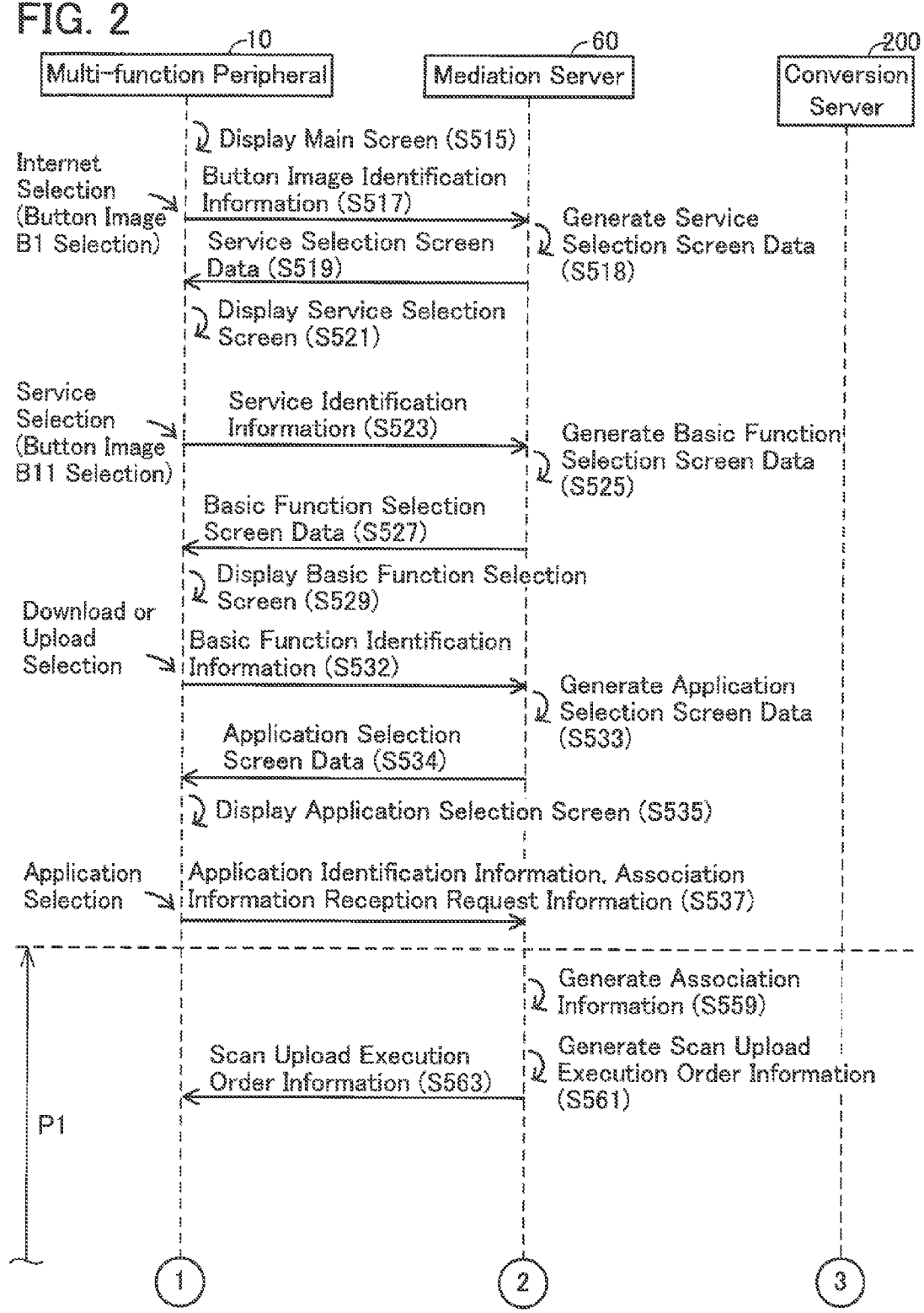
FIG. 2 shows a sequence diagram of various processing executed by each device.
Figure 3:
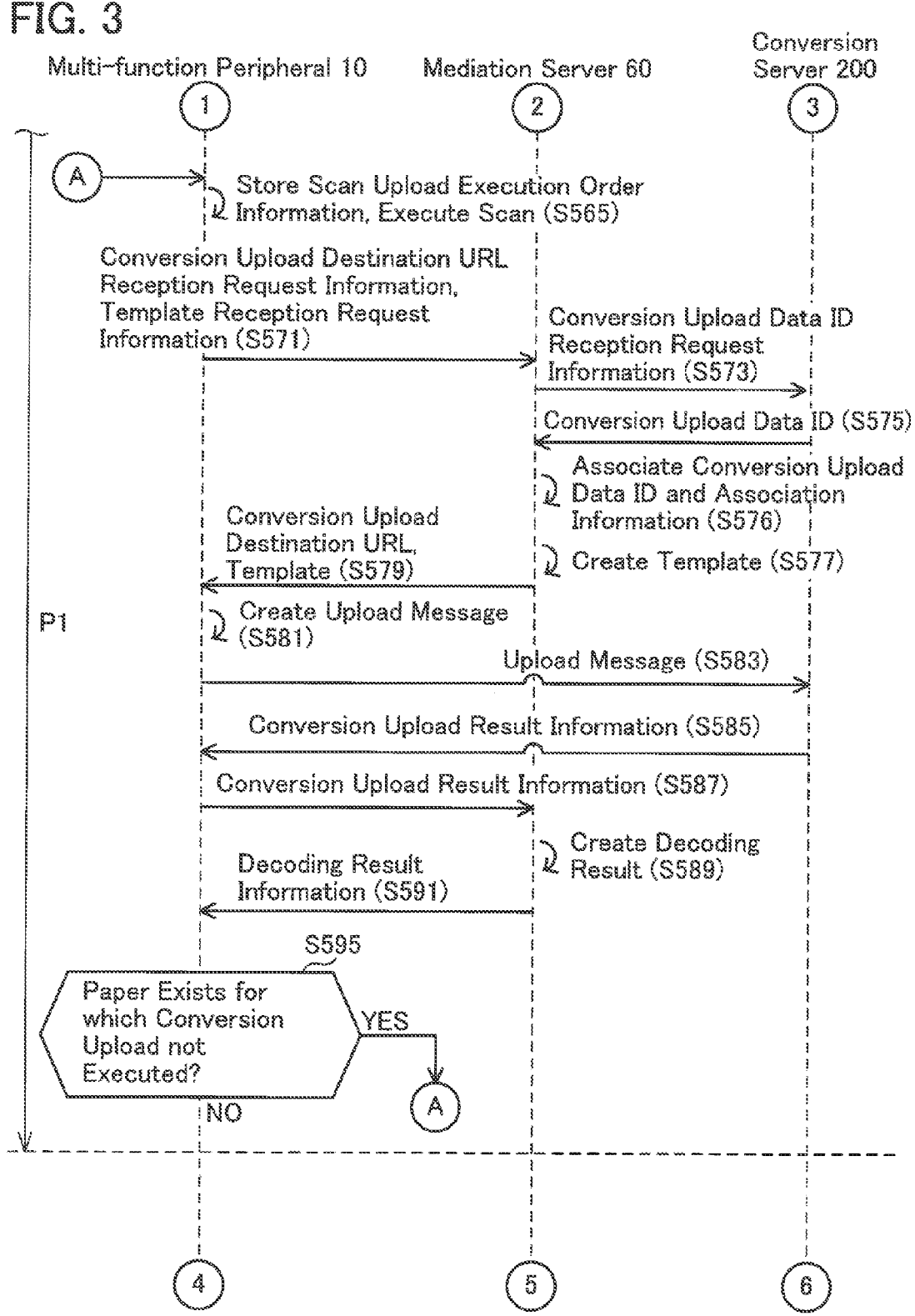
FIG. 3 shows a sequence diagram of various processing executed by each device.
Figure 4:
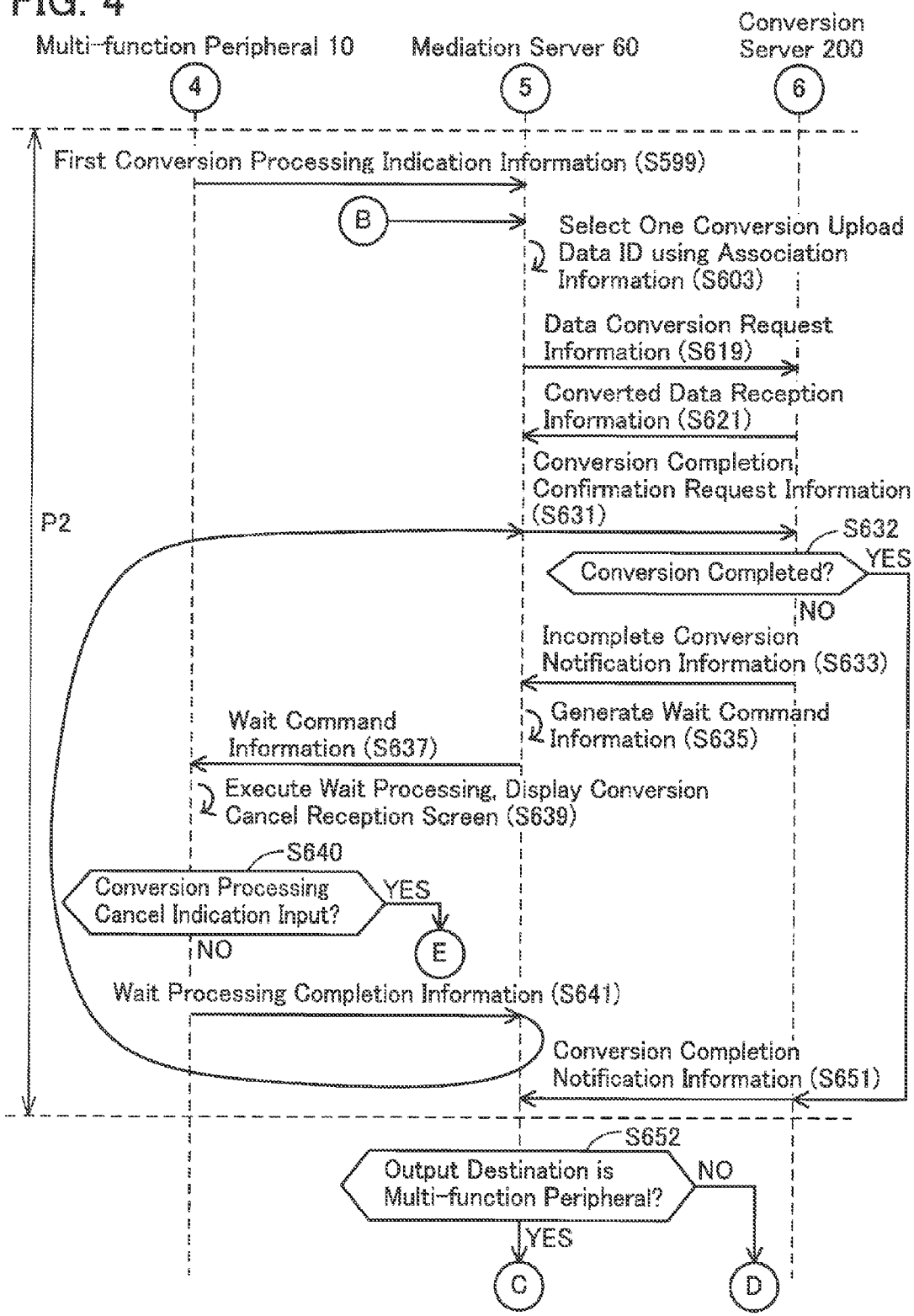
FIG. 4 shows a sequence diagram of various processing executed by each device.

As shown in FIG. 1, a communication system 2 includes a multi-function peripheral 10, a mediation server 60, contents servers 100 and 110, and a conversion server 200. The multi-function peripheral 10 is connected with a LAN 4. The mediation server 60, the contents servers 100 and 110, and the conversion server 200 are connected with an Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The multi-function peripheral 10 is configured to communicate with the mediation server 60 and the conversion server 200 via the network I/F 16. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24.

Further, the memory 24 comprises a URL storage area 26. The URL storage area 26 is an area used for storing received information when information having a URL description method has been received, and for generating information having the URL description method. Capacity of the URL storage area 26 may be determined in advance by a manufacturer of the multi-function peripheral 10. Generally, capacity of the URL storage area 26 is much smaller than capacity of an area which stores processing target data such as image data, etc. For example, the capacity of the URL storage area 26 is the capacity of 1000 characters.

(Structure of Mediation Server 60)

The mediation server 60 is a server independent of the conversion server 200 and the contents servers 100 and 110. The mediation server 60 is a server for mediating supply of image data from the contents servers 100 and 110 to the multi-function peripheral 10. The mediation server 60 is a server provided by a vendor or a manufacturer of the multi-function peripheral 10. The mediation server 60 includes a network I/F 62 and a controller 70. The mediation server 60 is configured to communicate with the multi-function peripheral 10, the contents servers 100 and 110, and the conversion server 200 via the network I/F 62. The controller 70 includes a CPU 72 and a memory 74. The memory 74 stores a program 75 and a table 76. The CPU 72 performs various processing in accordance with the program 75.

Figures 7, 8:
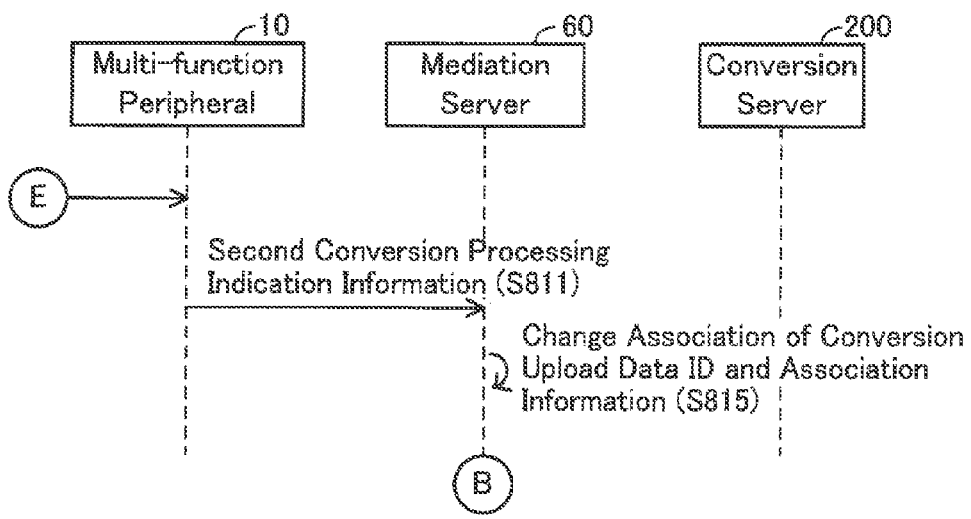
FIG. 7 shows a sequence diagram of various processing executed by each device.
FIG. 8 shows an example of a table.

FIG. 8 shows an example of the table 76. The table 76 is a storage area which stores an identification number, association information, and a conversion upload data ID. The table 76 is capable of storing a plurality of the association information. The identification number is information, for identifying each of the plurality of association information. The association information is information for identifying one group comprising one or more conversion upload data IDs. The conversion upload data ID is information for identifying upload data uploaded to the conversion server 200. Data size of one association information is smaller than total data size of the plurality of conversion upload data IDs associated with that one association information. In the example of FIG. 8, the identification number is "1", and five conversion upload data IDs are associated with the association information "FileListXXXX". Thus, the data size of the association information "FileListXXXX" is smaller than the total data size of the five conversion upload data IDs.

(Structure of the Conversion Server 200)

The conversion server 200 is a server configured as a separate entity from the mediation server 60 and the contents servers 100 and 110. The conversion server 200 executes conversion processing, described below, of data of various types. The conversion server 200 may be a server which is provided to a vendor of the multi-function peripheral 10. The conversion server 200 comprises a network interface 262 and a controller 270. The controller 270 comprises a CPU 272 and memory 274. The memory 274 stores a program 275. The CPU 272 executes various processing according to the program 275.

Some features relating to the description in the present specification are hereby explained. In the present specification, the description "the CPU 72 of the mediation server 60 receives various types of information" includes the technical meaning "the CPU 72 of the mediation server 60 receives various types of information via the network interface 62". Further, the description "the CPU 72 of the mediation server 60 transmits various types of information" includes the technical meaning "the CPU 72 of the mediation server 60 outputs various types of information via the network interface 62". Similar features exist regarding the CPU 272 of the conversion server 200 and the network interface 262. Similar features exist regarding the CPU 22 of the multi-function peripheral 10 and the network interface 16.

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

In the present specification, a case is explained in which the mediation server 60 and conversion server 200 are connected by the Internet 6 (that is, when a device functioning as the mediation server 60 and a device functioning as the conversion server 200 are disposed at physically distant positions), but other configurations are possible. The mediation server 60 and conversion server 200 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Does", "PICASA (registered trademark of Google, Inc.), "FACEBOOK (registered trademark of Facebook, Inc.)", etc. A user of the online service can upload or download various types of data to or from a storage area assigned to the user via the Internet 6. The contents server 100 comprises a data storage area 101. The data storage area 101 is an area in which various types of data is stored.

(Operation of Communication System)

Figure 9:
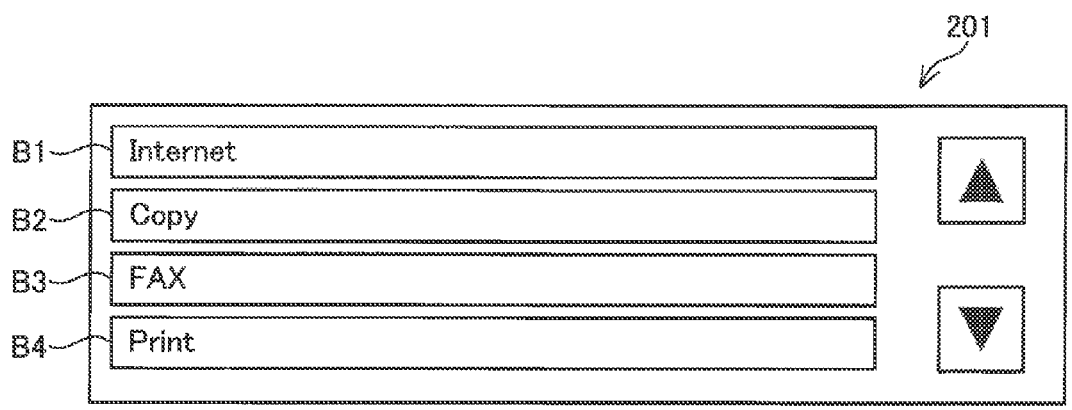
FIG. 9 shows an example of a main screen display.

Operation of the communication system 2 will be described using sequence diagrams of FIGS. 2 to 7. The multi-function peripheral 10, the mediation server 60, and the conversion server 200 may respectively become capable of executing the processing shown in the sequence diagram by their power being turned on. When an order for displaying a main screen is received, the CPU 22 of the multi-function peripheral 10 causes the display unit 14 to display the main screen in S515. The order for displaying the main screen may be input from the operating unit 12 by a user. Data for displaying the main screen may be preliminarily stored in the memory 24. An example of the main screen 201 is shown in FIG. 9. The main screen 201 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In the description example of the present embodiment, a case of causing the conversion server 200 to convert various types of data will be described. In this case, the button image B1 included in the main screen 201 is selected. In S517, the CPU 22 of the multi-function peripheral 10 sends button image identification information for identifying the selected button image B1 to the mediation server 60. An example of the button image identification information is "Internet" which is the name of the button image B1.

When receiving the button image identification information from the multi-function peripheral 10, the CPU 72 of the mediation server 60 specifies a service selection screen 211 as a screen data that is subsequently to be sent to the multi-function peripheral 10. The service selection screen 211 is a screen for allowing the user to select any one of the online services.

In S518, the CPU 72 of the mediation server 60 generates service selection screen data for displaying the service selection screen 211. Information (not illustrated) indicating which information needs to be included in the service selection screen data is stored in the memory 74. The CPU 72 of the mediation server 60 generates the service selection screen data according to this information. The service selection screen data includes information indicating that button images B11 and B12 are to be included in the service selection screen 211, information indicating that a screen for selecting any one of the button images B11 to B13 is to be displayed, information indicating that server names "Server 200", "Server 100" and "Service 110" correspond to the button images B11 to B13, respectively, and information indicating character strings to be displayed in association with the button images B11 to B13. In S519, the CPU 72 of the mediation server 60 sends the service selection screen data to the multi-function peripheral 10.

Figure 10:
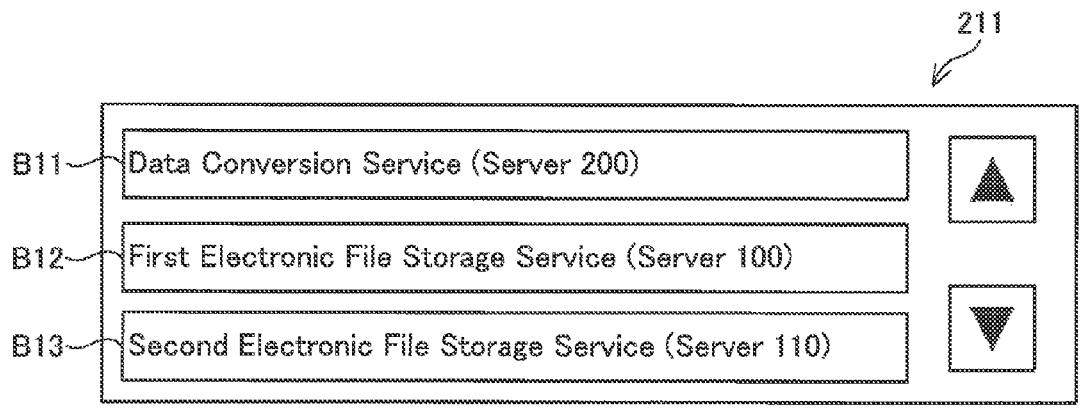
FIG. 10 shows an example of a service selection screen display.

When receiving the service selection screen data from the mediation server 60, the CPU 22 of the multi-function peripheral 10 displays the service selection screen 211 on the display unit 14 in S521. As illustrated in FIG. 10, the service selection screen 211 includes the button images B11 to B13. The button images B11 to B13 are images for accepting selection of the conversion server 200 and the contents servers 100 and 110, respectively. The CPU 22 of the multi-function peripheral 10 creates bitmap information or the like for displaying the images of the button images B11 to B13 based on the service selection screen data received from the mediation server 60 and displays the service selection screen 211 on the display unit 14. In this manner, since the bitmap information is created by the multi-function peripheral 10, bitmap information for displaying the images of the button images B11 to B13 does not need to be included in the service selection screen data. Further, bitmap information for displaying the Up and Down arrow buttons illustrated in FIG. 10 does not need to be included in the service selection screen data. The user operates the operating unit 12 to select a button image that represents the server, which provides desired service to the user, on the service selection screen 211. In the present embodiment, a case that the user selects the button image B11 (that is, the contents server 100) will be described as an example. Notably, the concept of "selecting a server" may include a concept of "selecting a service". Specifically, selecting the contents server 100 may be equivalent to selecting a service that the contents server 100 provides. Further, in a case that a plurality of servers for providing one service is present, the concept of "selecting a server" may include the concept of selecting at least one of the plurality of servers.

In S523, the CPU 22 of the multi-function peripheral 10 transmits service identification information associated with the button image selected by the user to the mediation server. In the description example of the present embodiment, service identification information including the server name "Server 200" is transmitted to the mediation server. In S525, based on the service identification information received from the multi-function peripheral 10, the CPU 72 of the mediation server 60 generates basic function selection screen data for causing the display of a basic function selection screen. The basic function selection screen is a screen for receiving an input to download data converted by the conversion server 200 to the multi-function peripheral 10 or to upload the data converted by the conversion server 200 to the contents servers 100 or 110.

In S527, the CPU 72 of the mediation server 60 transmits the basic function selection screen data to the multi-function peripheral 10. When receiving the basic function selection screen data from the mediation server 60, in S529 the CPU 22 of the multi-function peripheral 10 causes the basic function selection screen to be displayed by the display unit 14. Contents of the basic function selection screen are the same as those of the service selection screen 211 described above, and consequently a detailed explanation thereof is omitted.

In S529, the CPU 22 accepts selection of either download or upload. For example, selection may be accepted by the user operating the operating unit 12 to select a button image indicating processing to be executed from the basic function selection screen.

In S532, the CPU 22 of the multi-function peripheral 10 transmits basic function identification information to the mediation server 60 indicating that either download or upload has been selected.

In S533, based on the received basic function identification information, the CPU 72 of the mediation server 60 generates application selection screen data for causing the display of an application selection screen 221. The application selection screen is a screen for causing the user to select a type of application which converts data. A list of the applications may be displayed in the application selection screen, and an application may be selected from the list by the user. In the description example of the present embodiment, the following is included in the application selection screen data: information indicating that button images B21 to B24 are included in the application selection screen 221, information indicating that a screen for selecting any of the button images B21 to B24 is displayed, and information indicating application names associated with each of the respective button images B21 to B24. In S534, the CPU 72 transmits the application selection screen data to the multi-function peripheral 10.

Figure 11:
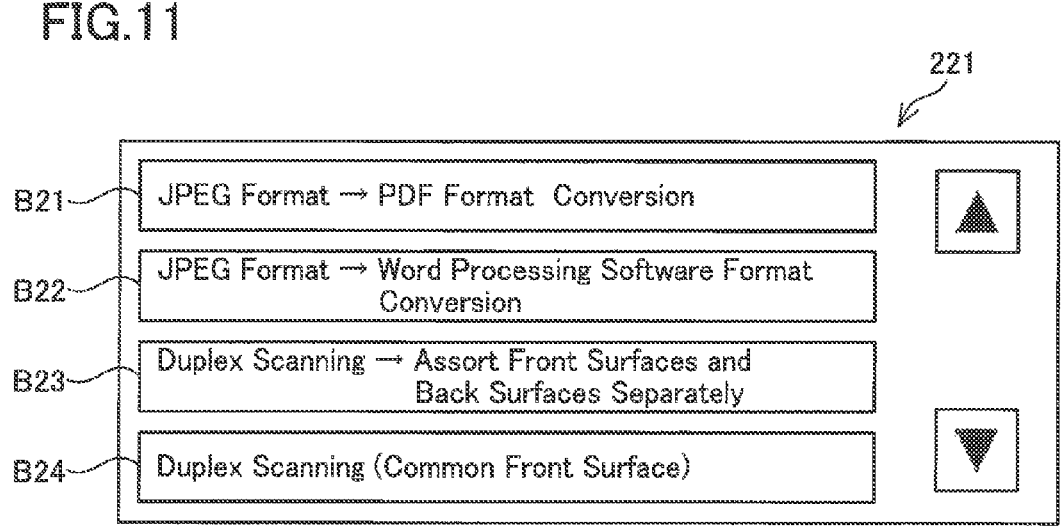
FIG. 11 shows an example of an application selection screen display.

When the application selection screen data is received from the mediation server 60, in S535 the CPU 22 of the multi-function peripheral 10 causes the application selection screen 221 to be displayed on the display unit 14. Thereupon, the CPU 22 accepts processing for selecting the type of application. As shown in FIG. 11, the application selection screen 221 includes the button images B21 to B24. The button images B21 to B24 are each images for accepting selection of an application. The user operates the operating unit 12 to select, from the application selection screen 221, a button image displaying an application for executing conversion processing to a desired data format.

In S537, the CPU 22 of the multi-function peripheral 10 transmits, to the mediation server 60, application identification information corresponding to the button image selected by the user, and the association information reception request information. The application identification information is information for identifying the selected application. The application identification information is described according to a Uniform Resource Locator (referred to as URL) description method. Specific contents of the application are appended to the URL as a query parameter. The association information reception request information is information for requesting the association information.

Conversion order processing P1 (S559 to S595) is processing to cause the upload data to be uploaded to the conversion server 200 from the multi-function peripheral 10. And is processing to order execution of conversion processing on the upload data uploaded to the conversion server 200. The conversion processing is processing to convert the upload data into converted data having a data format identified by the application identification information. Moreover, the processing which uploads the upload data to the conversion server 200 for conversion processing may be called "conversion upload". Further, the processing which uploads the upload data or the converted data to the contents server for storage may be called "save upload". Specific examples of conversion processing are processing to convert data in Joint Photographic Experts Group (referred to as JPEG) format into data in Portable Document Format (referred to as PDF), or processing to convert data in word processing software format into data in JPEG fox mat.

The contents of the conversion order processing P1 will be described below. In S559, the CPU 72 of the mediation server 60 generates the association information. Since the conversion upload data ID has not yet been received at this point, the conversion upload data ID associated with the association information is not present.

In S561, the CPU 72 of the mediation server 60 generates scan upload execution order information. Scan upload execution order information is information to order the multi-function peripheral 10 to upload the upload data generated by scanning processing. The scan upload execution order information is described according to a URL description method. Specific contents of the order are appended to the URL as a query parameter. Further, the association information generated in S559 is appended to the URL as a query parameter. In S563, the CPU 72 transmits the scan upload execution order information to the multi-function peripheral 10.

In S565, the CPU 22 of the multi-function peripheral 10 temporarily stores the received scan upload execution order information in the URL storage area 26. The CPU 22 executes a scan of the image based on the scan upload execution order information. Specifically, a screen is displayed indicating acceptance of an operation which indicates execution of a scan. The user sets paper, on which a prescribed image has been recorded, on the scan executing unit 19, and presses a start reading button of the operating unit 12, whereupon the CPU 22 causes the scan executing unit 19 to read the image recorded on the paper, and creates the upload data from the image data that was read. Moreover, in a case that a plurality of sheets of paper have been set, it is possible to cause one of the plurality of sheets of paper to be read.

In S571, the CPU 22 transmits conversion upload destination URL reception request information and template reception request information to the mediation server 60. The conversion upload destination URL reception request information is information for requesting the conversion server 200 for a conversion upload destination URL. The conversion upload destination URL is information needed for specifying an access destination when the conversion upload is to be executed. The template reception request information is information for requesting an upload message template, described below. The conversion upload destination URL reception request information and the template reception request information are described according to a URL description method. Further, the association information that is being stored in the URL storage area 26 is appended to the conversion upload destination URL reception request information and the template reception request information as a query parameter. By appending the association information, it is possible to identify execution target data of this request information.

In S573, the CPU 72 of the mediation server 60 transmits conversion upload data ID reception request information to the conversion server 200. The conversion upload data ID reception request information is information for requesting the conversion server 200 for the conversion upload data ID. The conversion upload data ID is information for identifying the upload data uploaded to the conversion server 200. That is, when uploading the execution target data, the CPU 72 receives the conversion upload data ID from the conversion server 200. In S575, the CPU 272 of the conversion server 200 transmits the conversion upload data ID to the mediation server 60.

In S576, the CPU 72 stores the conversion upload data ID transmitted in S575 and the association information transmitted in S571 in association with one another in the table 76. According to this, the conversion upload data ID and the association information are correlated with one another.

In S577, the CPU 72 creates an upload message template and the conversion upload destination URL. The upload message template is a template of a message when the upload data is to be uploaded to the conversion server 200. The upload message template is described according to a URL description method. Contents of the template are appended to the template as a query parameter. Further, the association information is also appended to the template as a query parameter. In S579, the CPU 72 transmits the conversion upload destination URL and the upload message template to the multi-function peripheral 10.

In S581, the CPU 22 temporarily stores the received conversion upload destination URL and the upload message template in the URL storage area 26. Thus, the CPU 22 creates the upload message based on the received template, the received conversion upload destination URL, and the upload data created in S565. Specifically, the multi-function peripheral 10 stores various types of information such as binary data of the upload data, the conversion upload destination URL, data size of the upload data, etc. in a prescribed location of the template received from the mediation server 60. According to this, it is possible to create an upload message corresponding to the conversion server 200. In S583, the CPU 22 transmits the upload message to the conversion server 200.

In S585, the CPU 272 of the conversion server 200 transmits conversion upload result information to the multi-function peripheral 10. The conversion upload result information is information indicating whether the upload data could be uploaded normally to the conversion server 200. In S587, the CPU 22 of the multi-function peripheral 10 transmits the conversion upload result information to the mediation server 60. The conversion upload result information is described according to a URL description method. Further, the association information which is being stored in the URL storage area 26 is appended to the conversion upload result information as a query parameter.

In S589, the CPU 72 of the mediation server 60 decodes the conversion upload result information and creates a decoding result. Conversion upload result information is information transmitted from the conversion server 200 to the multi-function peripheral 10, and thus has specifications particular to the conversion server 200. Hence by using a decoding program, not shown, included in the program 75 stored by the mediation server 60, the conversion upload result information can be decoded. A decoding result is a message in a format decodable by the multi-function peripheral 10. The decoding result includes the conversion upload result included in the decoded conversion upload result information.

In S591, the CPU 72 transmits decoding result information to the multi-function peripheral 10. The decoding result information is described according to a URL description method. Further, the association information is also appended to the decoding result information as a query parameter.

In S595, the CPU 22 determines whether paper is present for which the conversion upload has not been executed. This determination may be executed based on, for example, whether a paper which has not yet been scanned is remaining on an automatic document feeder (not shown) of the scan executing unit 19. If paper for which the conversion upload has not been executed is present (S595: YES), the process returns to S565, and if paper is not present (S595: NO), the process proceeds to S599.

Conversion processing P2 (S599 to S651) is processing for executing the conversion processing of the upload data. In S599, the CPU 22 of the multi-function peripheral 10 generates first conversion processing indication information, and transmits the generated first conversion processing indication information to the mediation server 60. The first conversion processing indication information is information to request execution of conversion processing on the one or more upload data identified by the association information. The first conversion processing indication information is described according to a URL description method. Specific contents of the order are appended to the URL as a query parameter. Further, the association information stored in the URL storage area 26 in S581 is also appended to the first conversion processing indication information as a query parameter. Further, the first conversion processing indication information is generated in the URL storage area 26. A correspondence relationship between the association information and the one or more upload data is stored in the table 76. Consequently, it is possible to request conversion processing for each of the one or more upload data by appending one item of association information to the first conversion processing indication information.

In S603, the CPU 72 selects one conversion upload data ID using the association information appended to the received first conversion processing indication information. Specifically, by referring to the table 76, the CPU 72 selects one conversion upload data ID for which the conversion upload has not yet been executed from among the one or more conversion upload data IDs associated with the association information.

In S619, the CPU 72 transmits data conversion request information to the conversion server 200. Data conversion request information is information to request execution of conversion processing of upload data identified by the conversion upload data ID selected in S603. In S621, the CPU 272 of the conversion server 200 transmits converted data reception information to the mediation server 60. Converted data reception information is information to identify conversion processing performed according to the processing to request execution of conversion processing (S619), and may include a conversion job ID. Converted data reception information may be described using a URL description method.

The conversion server 200 executes the conversion processing of the selection data in response to reception of the data conversion request information in S619. The conversion processing may be performed for the selection data divided into prescribed data amounts (for example, 100 kB).

In S631, the CPU 72 transmits conversion completion confirmation request information to the conversion server 200. The conversion completion confirmation request information is information requesting confirmation by the conversion server 200 as to whether the conversion processing requested of the conversion server 200 in S619 has been completed.

In S632, the CPU 272 of the conversion server 200 determines whether conversion processing has completed. Specifically, using the converted data reception information included in the conversion completion confirmation request information, one conversion processing item for determination as to whether the conversion processing has completed is specified. Then, it is determined whether the conversion of a prescribed amount of data (for example, 100 KB) in the leading portion of the selection data to be converted in the specified conversion processing has completed. In a case that the conversion processing has not completed (S632: NO), the process proceeds to S633.

In S633, the CPU 272 transmits to the mediation server 60 incomplete conversion notification information indicating that conversion processing has not completed. In S635, the CPU 72 of the mediation server 60 generates a wait command information in response to the reception of the incomplete conversion notification information. The wait command information is an information to cause the multi-function peripheral 10 to wait for the completion of the conversion processing. The wait command information is described according to a URL description method. Further, the association information received in S603 is also appended to the wait command information as a query parameter. In S637, the CPU 72 transmits the wait command information to the multi-function peripheral 10.

In S639, the CPU 22 of the multi-function peripheral 10 temporarily stores the received wait command information in the URL storage area 26. Then, based on the wait command information, the CPU 22 executes wait processing to wait for completion of the conversion processing. The wait processing may, for example, be processing to reset a timer which was started due to detecting a time out in the conversion processing, and to cause a restart. Further, for example, the wait processing may be processing to extend a period in which a time out in the conversion processing occurs by increasing a time out period stored in the memory 24.

Further, in the wait processing, the CPU 22 causes a conversion cancel reception screen to be displayed by the display unit 14. The conversion cancel reception screen is a screen for receiving input of a conversion processing cancel indication. If conversion processing for a plurality of upload data been indicated in S599, it is possible to accept the conversion processing cancel indication for a part of the plurality of upload data.

In S640, the CPU 22 determines whether the conversion processing cancel indication has been input. If the cancel indication has been input (S640: YES), the process proceeds to S811. In S811, the CPU 22 transmits second conversion processing indication information to the mediation server 60. The second conversion processing indication information is information for canceling the conversion processing of a part of the one or more upload data identified by the association information. The second conversion processing indication information is described according to a URL description method. Further, the association information stored in the URL storage area 26 in S639 is also appended to the second conversion processing indication information as a query parameter.

In S815, the CPU 72 of the mediation server 60 changes the association of the conversion upload data ID and the association information. Specifically, the conversion upload data ID which identifies the upload data for which conversion processing was cancelled by the second conversion processing indication information is deleted from the table 76. Then, the process returns to S603.

However, in S640, if the conversion processing cancel indication is not input even if a prescribed period has elapsed since the wait processing started (S640: NO), the process proceeds to S641. The prescribed period may be set in advance to a period corresponding to contents of the conversion processing. In S641, the CPU 22 transmits, to the mediation server 60, wait processing completion information indicating that execution of the wait processing has been completed. Thereupon, the process returns to S631.

However, if it was determined in S632 that conversion processing has been completed (S632: YES), the process proceeds to S651. In S651, the CPU 272 of the conversion server 200 transmits, to the mediation server 60, conversion completion notification information indicating that the conversion processing has been completed of a prescribed amount of data in the leading portion of the upload data.

In S652, the CPU 72 of the mediation server 60 determines whether an output destination of the data converted by the conversion server 200 is the multi-function peripheral 10. This determination may be executed based on the basic function identification information received in S532. If the output destination of the data is the multi-function peripheral 10 (S652: YES), the process proceeds to S753.

Figure 5:
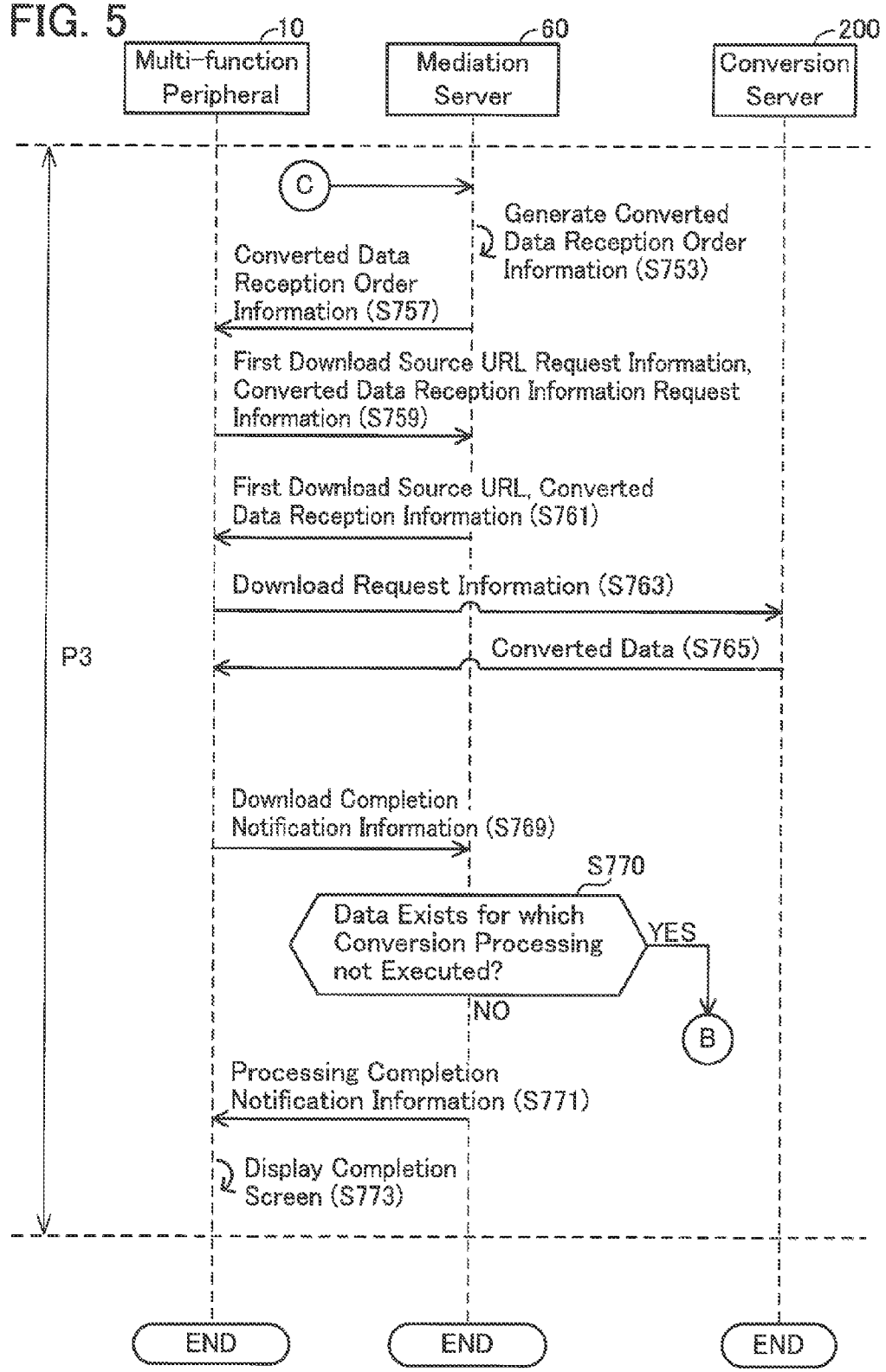
FIG. 5 shows a sequence diagram of various processing executed by each device.
Figure 6:
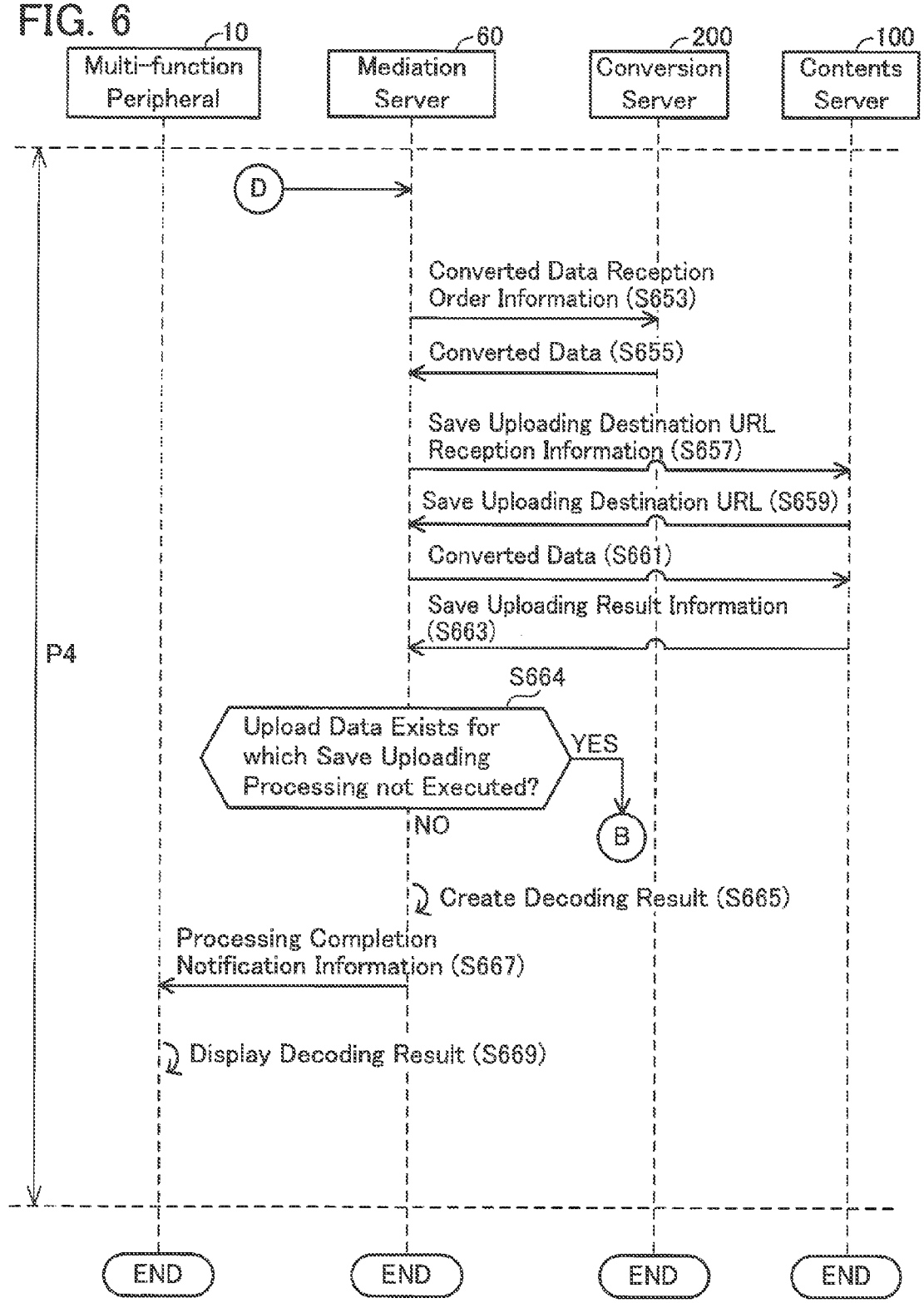
FIG. 6 shows a sequence diagram of various processing executed by each device.

FIG. 5 is used to explain the download processing P3. The download processing P3 (S753 to S773) is processing to cause the multi-function peripheral 10 receive the converted data. In S753, the CPU 72 of the mediation server 60 generates converted data reception order information. The converted data reception order information is an order to cause the multi-function peripheral 10 to receive one converted data from the conversion server 200. The converted data reception order information is described according to a URL description method. Further, one conversion upload data ID for identifying one converted data is appended to the converted data reception order information as a query parameter. If there exists upload data for which conversion processing has not yet been executed, the CPU 72 includes conversion processing execution request information in the converted data reception order information. However, if there does not exist upload data for which conversion processing has not yet been executed, conversion processing end request information is included in the converted data reception order information. The conversion processing execution request information and the conversion processing end request information are appended to the converted data reception order information as a query parameter.

In S757, the CPU 72 transmits the converted data reception order information to the multi-function peripheral 10. In S759, the CPU 22 of the multi-function peripheral 10 transmits first download source URL request information and the converted data reception information request information to the mediation server 60. The first download source URL request information is information to request of the mediation server 60 a first download source URL to access the converted data, for which conversion completion confirmation was performed in S631. The converted data reception information request information is information to identify the job which has generated converted data, for which conversion completion confirmation was performed in S631.

In S761, the CPU 72 transmits the first download source URL and the converted data reception information to the multi-function peripheral 10. According to this, in response to the completion of the conversion processing of a prescribed amount of data in the leading portion of the upload data (S732: YES), information to receive the converted data is transmitted to the multi-function peripheral 10.

In S763, the CPU 22 of the multi-function peripheral 10 generates download request information for downloading one converted data identified by the converted data reception information. The download request information is generated within the URL storage area 26. The download request information is described according to a URL description method. Further, one conversion upload data ID for identifying one converted data is appended to the download request information as a query parameter. Then, based on the first download source URL, the CPU 22 transmits the generated download request information to the conversion server 200. In S765, the CPU 272 of the conversion server 200 transmits the converted data identified by the download request information to the multi-function peripheral 10. In the conversion server 200, when processing to convert upload data is performed for prescribed amounts of data (for example, 100 kB) at a time, at the time the download request information is transmitted to the conversion server in S763, there are cases in which conversion of all the upload data has not ended. In such cases, the conversion server immediately returns to the multi-function peripheral 10 information indicating that conversion is not completed. The information is returned immediately, and thus there is no occurrence of a timeout in the multi-function peripheral 10. The multi-function peripheral 10, having received information indicating that conversion is not completed, returns to S763, and again transmits the download request information to the conversion server. In S763, at the time when the download request information is transmitted to the conversion server, even if the conversion of all the upload data is not ended, in S765 the conversion server may transmit a prescribed amount of the converted data to the multi-function peripheral 10, and the multi-function peripheral 10, having received the prescribed amount of the converted data, may return to S763 and transmit to the conversion server the download request information requesting the remaining converted data.

In S769, when the receiving processing for one converted data item is completed, the CPU 22 transmits to the mediation server 60 download completion notification information indicating that download is completed. The download completion notification information is described according to a URL description method. Further, the conversion processing execution request information, or the conversion processing end request information, included in the converted data reception order information received in S757 is also appended to the download completion notification information as a query parameter.

In S770, the CPU 72 of the mediation server 60 determines whether there exists upload data for which conversion processing has not yet been executed. The determination as to whether there is upload data for which conversion processing has not been executed may be performed based on download completion notification information received from the multi-function peripheral 10. Specifically, when the conversion processing execution request information is included in the download completion notification information, it may be determined that there exists upload data for which conversion processing has not yet been executed. Further, when conversion processing end request information is included in download completion notification information, it may be determined that there does not exist upload data for which conversion processing has not yet been executed.

If upload data exists for which print processing has not yet been executed (S770: YES), the process returns to S603 (FIG.

4), the next upload data is selected, and processing to convert the next upload data is started.

However, when there does not exist upload data for which conversion processing has not yet been executed (S770: NO), the process proceeds to S771. In S771, the CPU 72 of the mediation server 60 transmits the processing completion notification information to the multi-function peripheral 10. In S773, the CPU 22 of the multi-function peripheral 10 causes a completion screen to be displayed by the display unit 14. Then, the flow of processing is ended.

However, in S652, if it is determined that the output destination of the data converted by the conversion server 200 is the contents server 100 (S652: NO), the process proceeds to S653. The upload processing P4 is explained. The upload processing P4 (S653 to S669) is processing to upload and save converted data from the mediation server 60 to the content server 100.

In S653, the CPU 72 of the mediation server 60 transmits converted data reception order information to the conversion server 200. Converted data reception order information is an order to cause the conversion server 200 to transmit converted data, identified by converted data reception information, to the mediation server 60.

In S655, the CPU 272 of the conversion server 200 transmits converted data, specified by the converted data reception order information, to the mediation server 60. In the conversion server 200, when performing conversion processing of the upload data a prescribed amount of data at a time (for example, 100 kB), in S655 the converted data may be transmitted the prescribed amount of data at a time to the mediation server 60.

In S657, the CPU 72 of the mediation server 60 transmits save uploading destination URL reception request information to the content server 100. Save uploading destination URL reception request information is information to request a save uploading destination URL, which is information necessary to perform uploading to the content server 100. In S659, the CPU 72 receives a save uploading destination URL transmitted from the content server 100. In S661, the CPU 72 of the mediation server 60 transmits converted data to the content server 100. In S663, the CPU 72 receives save uploading result information transmitted from the content server 100. Save uploading result information is information indicating whether the converted data has been stored normally on the content server 100.

In S664, the CPU 72 determines whether upload data exists for which save uploading processing has not yet been executed. In a case that the upload data for which the save uploading processing has not yet been executed exists (S664: YES), the process returns to S603 (FIG. 4), the next upload data is selected, and processing to convert the next upload data is started.

However, in a case that selection data for which the save uploading processing has not yet been executed does not exist (S664: NO), the process proceeds to S665. In S665, the CPU 72 decodes the save uploading result information and creates a decoding result. For example, if the data size of the uploaded converted data exceeds the data size which can be stored on the content server 100, a decoding result is created indicating that saving was not possible because the capacity was exceeded.

In S667, the CPU 72 of the mediation server 60 transmits processing completion notification information to the multi-function peripheral 10. Processing completion notification information includes data to cause the display unit 14 of the multi-function peripheral 10 to display the decoding result. In S669, the CPU 22 of the multi-function peripheral 10 causes the display unit 14 to display the decoding result based on the processing completion notification information. Then, the flow of processing is ended.

(Specific Example of Operation of Communication System)

A specific example of the operation of the communication system 2 will be described. As an example, a case is described in which download is selected in S529. Further, a case is described in which three pages of document are set on the automatic document feeder. Further, a case is described in which the association information having the identification number "1" is being stored in the table 76. Further, a case is described in which the conversion processing cancel indication is input for the third page in S640.

When the user selects an application (S535), the application identification information and the association information reception request information are transmitted to the mediation server 60 (S537). The mediation server 60 generates association information "FileListYYYY", which has the identification number "2", in the table 76 (see area R1, FIG. 8) (S559). The mediation server 60 transmits, to the multi-function peripheral 10, the scan upload execution order information to which the association information "FileListYYYY" has been added (S563).

The multi-function peripheral 10 scans the first page of the document, creating first upload data (S565). The multi-function peripheral 10 transmits the conversion upload destination URL reception request information and the template reception request information to the mediation server 60 (S571). The mediation server 60 receives "FileFFF", which is the conversion upload data ID identifying the first upload data, from the conversion server 200 (S575). The mediation server 60 stores the conversion upload data ID "FileFFF" in association with the association information "FileListYYYY" in the table 76 (see area R2, FIG. 8) (S576). When the conversion upload destination URL and the upload message template have been transmitted to the multi-function peripheral 10 (S579), the multifunction peripheral 10 transmits an upload message to the conversion server 200 (S583).

Since paper exists for which the conversion upload has not been executed (S595: YES), the multi-function peripheral 10 scans a second page of the document, creating second upload data (S565). Below, processing the same as with the first upload data is executed. According to this, conversion upload data ID "FileGGG" identifying the second upload data can be associated with the association information "FileListYYYY" and stored in the table 76 (see area R3, FIG. 8) (S576). Further, processing the same as with the second upload data is executed on third upload data generated by scanning a third page of the document. According to this, conversion upload data ID "FileHHH" identifying the third upload data can be associated with the association information "FileListYYYY" and stored in the table 76 (see area R4, FIG. 8) (S576).

When the conversion upload for the three pages of document has been completed (S595: NO), the multi-function peripheral 10 transmits the first conversion processing indication information to the mediation server 60 (S599). The association information "FileListYYYY" is appended to the first conversion processing indication information as a query parameter. The mediation server 60 selects "FileFFF", which is the first conversion upload data ID, from among the conversion upload data IDs associated with the association information "FileListYYYY" (S603). The mediation server 60 transmits, to the conversion server 200, the data conversion request information for requesting conversion processing on the first upload data identified by the selected conversion upload data ID "FileFFF" (S619).

During the conversion processing of the first upload data, the conversion cancel reception screen is caused to be displayed by the display unit 14 (S639). Here, as an example, a case will be described where the user inputs the conversion processing cancel indication for the third page of the document. When the cancel indication is input (S640: YES), the multi-function peripheral 10 transmits, to the mediation server 60, the second conversion processing indication information which indicates that the conversion processing on the third upload data is to be cancelled (S811). The mediation server 60 deletes, from the table 76, "FileHHH", which is the conversion upload data ID identifying the third upload data for which the conversion processing was cancelled (see area R4, FIG. 8) (S815).

When the conversion processing of the first upload data has been completed (S632: YES), since the output destination of the converted data is the multi-function peripheral 10 (S652: YES), the mediation server 60 transmits the converted data reception order information to the multi-function peripheral 10 (S757). The multi-function peripheral 10 receives, from the conversion server 200, the converted data obtained by converting the first upload data (S765).

Since upload data exists for which the conversion processing has not yet been executed (S770: YES), the mediation server 60 selects "FileGGG", which is the second conversion upload data ID (S603). Below, processing is executed which is the same as the case that the first conversion upload data ID was selected. According to this, converted data obtained by converting the second upload data identified by the second conversion upload data ID "FileGGG" can be received from the conversion server 200 (S765). Since the conversion processing of the third upload data has been cancelled, it is determined that conversion processing on all the upload data has been completed (S770: NO). Then, the multi-function peripheral 10 causes the completion screen to be displayed by the display unit 14 (S773).

(Effects)

In the communication system 2 described in the present specification, it is possible to cause an external device of the multi-function peripheral 10 to execute various types of processing by transmitting various types of indication information to the mediation server 60 from the multi-function peripheral 10. Further, it is necessary for the various types of indication information to include information for identifying data which is the target of processing. For example, in the description example of the present embodiment, it is possible to cause the conversion server 200 to execute the conversion processing by transmitting the first conversion processing indication information from the multi-function peripheral 10 to the mediation server 60 (S599). Here, since the first conversion processing indication information is described according to a URL description method, the first conversion processing indication information is generated within the URL storage area 26. However, the capacity of the URL storage area 26 is much smaller than the capacity of an area which stores actual data, such as image data. Further, since the capacity of the URL storage area 26 is determined in advance at the time of manufacturing the multi-function peripheral 10, it is difficult for the capacity of the URL storage area 26 to be expanded by the user. Thus, if the conversion upload data ID is used as information for identifying data which is the target of conversion processing, the data size of the first conversion processing indication information may exceed the capacity of the URL storage area 26, making it no longer possible to put out an instruction to execute conversion processing. This is because, in case of instructing conversion of a plurality of data, the first conversion processing indication information must include conversion upload data IDs for identifying each of the plurality of data. Further, this is because the conversion upload data IDs may have a large amount of data, such as for example a character string of 100 characters or more. For example, a case can be considered in which the conversion upload data ID displayed as "FileFFF", etc. in the present embodiment is a character string of 100 characters or more, and the capacity of the URL storage area 26 is 1000 characters. In this case, if the number of pages of the document to be scanned in S565 is ten or more pages, ten or more conversion upload data IDs are included in the first conversion processing indication information. Thereupon, the data size of the first conversion processing indication information generated in S599 exceeds the capacity of the URL storage area 26.

Therefore, in the technique disclosed in the present specification, one item of association information is generated corresponding to the plurality of conversion upload data IDs (S576). Then, the one item of association information is included in the first conversion processing indication information transmitted from the multi-function peripheral 10 to the mediation server 60 (S599). According to this, it is possible to specify a plurality of data at the mediation server 60 side based on the one item of association information (S603). Further, according to this, since it is not necessary for the multi-function peripheral 10 to generate the first conversion processing indication information that includes a plurality of conversion upload data IDs, the amount of data to be handled by the multi-function peripheral 10 can be suppressed. Hence, it is possible to prevent a situation in which the capacity of the URL storage area 26 is occupied.

The data size of the one item of association information is smaller than the data size of all the plurality of conversion upload data IDs associated with the one item of association information. According to this, by using the association information instead of the conversion upload data IDs, the amount of data to be handled by the multi-function peripheral 10 can be suppressed.

Even in a case that conversion of a plurality of data was instructed by the first conversion processing indication information (S599), the multi-function peripheral 10 can be caused to receive the converted data one at a time (S765) in the download processing P3 (S753 to S773). According to this, a plurality of conversion upload data IDs are not included in the download request information, and consequently the amount of data to be handled by the multi-function peripheral 10 when generating the download request information (S763) can be suppressed.

Hence, it is possible to prevent a situation in which the capacity of the URL storage area 26 is mostly occupied.

The network I/F 62 of the mediation server 60 is configured to be able to communicate with the service servers 100 and 110. According to this, it is possible to execute the upload processing P4 (S653 to S669) in which conversion processing is executed by the conversion server 200 on data output from the multi-function peripheral 10, and the converted data is uploaded to and saved on the contents servers 100 and 110.

During conversion processing of the data, it is possible to cause the conversion cancel reception screen to be displayed by the display unit 14 (S639). According to this, during conversion processing, it is possible to change the data on which the conversion processing is to be executed. Hence, the amount of information handled by the multi-function peripheral 10 can be suppressed, and it is possible to increase flexibility of processing for selecting conversion target data.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(First Variant)

The number of items of association information generated in S559 may be a plurality. In the first variant, a configuration will be described in which, in case of duplex scanning of a document with a plurality of pages in S565, first association information is associated with data of a front surface, and second association information is associated with data of a back surface. As an example, a case will be described in which two pages of a document are set on the automatic document feeder. Further, a case will be described in which download is selected in S529.

In S537, when the user touches a button image B23 (see FIG. 11), an application is selected in which duplex scanning is executed, and the data is handled separately in a group of only the data of the front surface and a group of only the data of the back surface. The mediation server 60 generates, in the table 76, association information "FileListXXXX-1" in which the identification number is "1" (see area R11, FIG. 12), and association information "FileListXXXX-2" in which the identification number is "2" (see area R12, FIG. 12) (S559). The association information "FileListXXXX-1" is information for associating the data of the front surface. The association information "FileListXXXX-2" is information for associating the data of the back surface.

The multi-function peripheral 10 scans the front surface of the first page of the document, and creates upload data of a first front surface (S565). The multi-function peripheral 10 transmits, to the mediation server 60, the conversion upload destination URL reception request information, the template reception request information, and first attribute information indicating that the data is the data of the front surface of the document (S571). The mediation server 60 receives "FileAAA-1", which is the conversion upload data ID for identifying the first upload data, from the conversion server 200 (S575). The mediation server 60 stores, in the table 76, the conversion upload data ID "FileAAA-1" in association with the association information "FileListXXXX-1" identified by the first attribute information (see area R13, FIG. 12) (S576). Next, when upload data of the first back surface has been created (S565), second attribute information indicating that the data is data of the back surface of the document is transmitted to the mediation server 60 (S571). Then, "FileAAA-2", which is the conversion upload data ID for identifying the upload data of the first back surface, is associated with the association information "FileList XXXX-2" identified by the second attribute information (see area R14, FIG. 12). Below, similarly, "FileBBB-1", which is the conversion upload data ID for identifying the upload data of a second front surface, is associated with the association information "FileList XXXX-1" (see area R15, FIG. 12). Further, "FileBBB-2", which is the conversion upload data ID for identifying the upload data of a second back surface, is associated with the association information "FileList XXXX-2" (see area R16, FIG. 12).

When the conversion upload is completed (S595: NO), the multi-function peripheral 10 transmits the first conversion processing indication information, to which the association information "FileList XXXX-1" has been appended, to the mediation server 60 (S599). According to this, conversion processing is executed on the upload data having the conversion upload data IDs (i.e., "FileAAA-1" and "FileBBB-1") associated with the association information "FileList XXXX-1". Thereby, the multi-function peripheral 10 can receive converted data in which the data of the front surface has been converted (S765).

Next, the multi-function peripheral 10 transmits the first conversion processing indication information, to which the association information "FileList XXXX-2" has been appended, to the mediation server 60 (S599). According to this, conversion processing is executed on the upload data having the conversion upload data IDs (i.e., "FileAAA-2" and "FileBBB-2") associated with the association information "FileListXXXX-2". Thereby, the multi-function peripheral 10 can receive converted data in which the data of the back surface has been converted (S765).

According to the first variant, by using the plurality of association information, the upload data can be divided into a group of data of the front surface of the document and a group of data of the back surface of the document. Hence, for example, it is possible to execute data processing which differs for each group, such as executing color conversion processing on the data of the front surface and executing monochrome conversion processing on the data of the back surface. Alternatively, the converted data corresponding to the front surface and the converted data corresponding to the back surface may be correctly combined to create one set of document data. Alternatively, identification information indicating which surface the data corresponds to may be appended to the converted data. According to this, it is possible to execute processing in the multi-function peripheral 10 after recognizing whether the received data is data corresponding to the front surface.

(Second Variant)

In the second variant, a configuration will be described in which one item of integrated association information is generated in which the plurality of association information is integrated. As an example, a case will be described in which two pages of a document are set on the automatic document feeder. Further, a case will be described in which written contents of the front surface of the two pages of the document are the same, and the written contents of the back surface are different. An example of such a document is paper, this having been written on, having an explanation printed on the front surface, while a questionnaire having columns in which to write has been printed on the back surface. Further, a case will be described in which download is selected in S529.

In S537, when the user touches a button image B24 (see FIG. 11), an application is selected for executing duplex scanning on the plurality of documents having the same front surface. The mediation server 60 generates, in the table 76, the association information "FileListXXXX" for associating the data of the first page of the document (see area R21, FIG. 13), the association information "FileListYYYY" for associating the data of the second page of the document (see area R22, FIG. 13), and the integrated association information "FileListZZZZ" (see area R23, FIG. 13) (S559). The integrated association information "FileListZZZZ" is information in which the association information "FileListXXXX" and "FileListYYYY" are integrated such that duplicate data does not exist.

The multi-function peripheral 10 scans the front surface and the back surface of the first page of the document, and creates upload data of the first front surface and back surface (S565). The mediation server 60 stores, in the table 76, the conversion upload data ID (i.e., "FileAAA-1") identifying the data of the front surface, and the conversion upload data ID (i.e., "FileAAA-2") identifying the data of the back surface, in association with the association information "FileList XXXX" (see area R24, FIG. 14) (S576).

Next, the multi-function peripheral 10 scans the front surface and the back surface of the second page of the document, and creates upload data of the second front surface and back surface (S565). The mediation server 60 stores, in the table 76, the conversion upload data ID (i.e., "FileBBB-1") identifying the data of the front surface, and the conversion upload data. ID (i.e., "FileBBB-2") identifying the data of the back surface, in association with the association information "FileListYYYY" (see area R25, FIG. 13) (S576).

Further, the mediation server 60 integrates the conversion upload data ID "FileListXXXX" and the conversion upload data ID "FileListYYYY" and associates them with the integrated association information "FileListZZZZ" (see area R26, FIG. 13). Data identified by the conversion upload data ID "FileAAA-1", and data identified by the conversion upload data ID "FileBBB-1" both have the same contents, and are duplicate. Consequently, "FileBBB-1" is not present in the conversion upload data ID associated with the integrated association information "FileListZZZZ" (see area R26).

When conversion, upload has been completed (S595: NO), the multi-function peripheral 10 transmits, to the mediation server 60, the first conversion processing indication information to which the integrated association information "FileList ZZZZ" has been appended (S599). According to this, the conversion processing is executed on upload data having the conversion upload data ID corresponding to the association information "FileList ZZZZ" (i.e., "FileAAA-1", "FileAAA-2", "FileBBB-2").

According to the second variant, if the same data (i.e., data identified by the conversion upload data IDs "FileAAA-1" and "FileBBB-1") are present in the plurality of data identified by the association information "FileListXXXX" and the association information "FileListYYYY" respectively, it is possible to prevent duplicate conversion processing being executed on the same data. Hence, efficiency of the conversion processing can be increased. Moreover, since it is recognized that "FileBBB-1", which is a duplicate of "FileAAA-1", is present in the mediation server 60, information indicating that "FileBBB-1" is duplicate may be transmitted together with the converted data reception order information for "FileAAA-1" (S757). According to this, in the multi-function peripheral 10, processing can be executed after recognition that "FileAAA-1" and "FileBBB-1" are duplicate. Alternatively, when the converted data "FileAAA-1" was received (S655), this converted data may be replicated, and processed as the converted data "FileBBB-1".

(Other Variants)

An reception source, when the conversion server 200 receives the upload data which is the target of conversion processing, is not restricted to the multi-function peripheral 10. That is, the configuration is not restricted to a configuration which transmits the upload message from the multi-function peripheral 10 to the conversion server 200 in S583. For example, information for requesting that upload data being stored in another server be received as the conversion target, may be transmitted from the multi-function peripheral 10 to the conversion server 200. In this case, the conversion server 200 may return the conversion upload result information (S585) to the multi-function peripheral 10 in response to receiving the upload data that is being stored in the other server. Further, for example, the conversion server 200 itself may be storing data that is the conversion target. In this case, the conversion server 200 may return the conversion upload result information (S585) to the multi-function peripheral 10 in response to reading the data that is the conversion target which is being stored in the memory 274 of the conversion server 200.

Processing for changing the association between the conversion upload data ID and the association information may be omitted. In this case, S640, S811, S815 are omitted, and processing may proceed from S639 to S641. Processing to output the wait command to the multi-function peripheral may be omitted. In this case, S635-S641 may be omitted. In this case, processing may return from S633 to S631. From the above, generally speaking, the server may comprise at least a "receiving a plurality of target data", a "generating a plurality of target data identification information", a "storing one item of association information and causing the network interface to output the one item of association information", a "receiving the one item of association information and data processing execution instruction information" and a "executing the data processing". As a specific example, the server may execute at least S583, S575, S599, and S619.

In the present embodiment, a case was explained in which contents servers 100 and 110 are connected to the Internet 6; but three or more contents servers may be connected to the Internet 6.

In the embodiment, the case is described in which the CPUs 22, 72 and 272 of the multi-function peripheral 10, the mediation server 60 and the conversion server 200 execute processing according to software, but is not limited thereto. At least a part of functions provided according to the software may be provided by hardware such as a logic circuit.

The program 75 stored in the memory 74 and the program 275 stored in the memory 274 may be executed by any one of the following configurations: a plurality of CPUs combined with each other; one or more application specific integrated circuits (referred to as ASICs); and one or more CPUs and one or more ASICs combined with each other.

A concept that includes the mediation server 60 and the conversion server 200 may be referred to as a "server". That is, the "server" as claimed may include the configuration including the mediation server 60 and the conversion server 200 as described in the specification.

The invention claimed is:

1. A server comprising:
   a network interface configured to connect with a network;
   a processor coupled to the network interface; and
   a memory storing instructions, which when executed by the processor cause the server to perform:
   receiving, via the network interface, a plurality of target data transmitted by an image processing device which is connected with the network, the plurality of target data being data on which data processing is to be executed;
   generating a plurality of target data identification information for identifying each of the plurality of target data;
   storing one item of association information corresponding to the plurality of target data identification information in a storage unit provided in the server and transmitting the one item of association information to the image processing device via the network interface in a case that the target data identification information is generated;
   receiving, via the network interface, the one item of association information and data processing execution instruction information transmitted by the image processing device, the data processing execution instruction information being for instructing execution of the data processing on the target data identified by the target data identification information corresponding to the one item of association information; and
   executing the data processing on the target data identified by the target data identification information corresponding to the one item of association information from among the plurality of target data received by the receiving of the plurality of target data, in a case that the one item of association information and the data processing execution instruction information is received.

2. The server as in claim 1, wherein
the instructions further cause the server to perform receiving, via the network interface, processing request information transmitted by the image processing device and requesting the data processing;
the generating of the plurality of target data identification information includes generating the target data identification information in a case that the processing request information is received,
the transmitting of the one item of association information includes transmitting the one item of association information, which corresponds to the plurality of target data identification information, to the image processing device, in a case that the target data identification information is generated in response to a reception of the processing request information
the receiving of the plurality of target data includes receiving the plurality of target data in association with the target data identification information in response to a reception of reception request information via the network interface after the one item of association information is transmitted,
 the reception request information being for requesting reception of the plurality of target data, and
 the reception request information having been transmitted by the image processing device, the image processing device being a destination of the one item of association information; and
the executing of the data processing on the target data includes executing the data processing on the target data identified by the target data identification information corresponding to the one item of association information from among the plurality of target data, in a case that the one item of association information and the data processing execution instruction information transmitted by the image processing device which is the destination of the one item of association information is received after the one item of association information is transmitted.

3. The server as in claim 1, wherein
the server comprises a first server and a second server,
the executing of the data processing includes:
 receiving the target data identification information of target data in response to a reception of the one item of association information, the target data corresponding to the one item of association information from among the plurality of target data received by the receiving of the plurality of target data;
 transmitting indication information indicating execution of the data processing on the target data identified by the target data identification information in a case that the target data identification information has been received by the receiving of the target data identification information; and
 executing the data processing on the target data identified by the target data identification information in a case that the indication information is transmitted by the transmitting of the indication information,
wherein
the first server comprises a first processor configured to cause the first server to perform:
 the transmitting of the one item of association information;
 the receiving of the one item of association information;
 the receiving of the target data identification information; and
 the transmitting of the indication information, and
the second server comprises a second processor configured to cause the second server to perform:
 the generating of the plurality of target data identification information;
 the receiving of the plurality of target data; and
 the executing of the data processing on the target data identified by the target data identification information in a case that the indication information has been transmitted by the transmitting of the indication information.

4. The server as in claim 1, wherein the instructions further cause the server to perform:
transmitting, via the network interface, the plurality of target data processed by the data processing to the image processing device.

5. The server as in claim 1, wherein
the network interface is further configured to communicate with an external device, and
the instructions further cause the server to perform transmitting, via the network interface, the plurality of target data processed by the executing of the data processing to the external device.

6. The server as in claim 1, wherein
an amount of information of the one item of association information is smaller than an amount of information of all the plurality of target data identification information.

7. The server as in claim 1, wherein
the instructions further cause the server to perform receiving attribute information indicating an attribute of each of the plurality of target data,
the generating of the plurality of target data identification information includes:
 dividing the plurality of target data identification information, based on the attribute information, into a plurality of groups, and
 generating a plurality of the one item of association information for each of the plurality of groups, and
the executing of the data processing on the target data includes receiving, via the network interface, the plurality of target data identified by the received one item of association information, and executing the data processing on the received plurality of target data in response to a reception of any one of the plurality of the one item of association information transmitted by the image processing device.

8. The server as in claim 7, wherein
the attribute information is information indicating whether each of the plurality of target data has the attribute of being either a front surface or a back surface of a document,
the generating of the plurality of target data identification information includes:
 generating first association information for a first group of the plurality of target data identification information having the attribute of being the front surface; and
 generating second association information for a second group of the plurality of target data identification information having the attribute of being the back surface, and
the executing of the data processing on the target data includes receiving, via the network interface, the plurality of target data identified by the received first association information or the received second association information, and executing the data processing on the received plurality of target data in response to a reception of the first association information or the second association information transmitted by the image processing device.

9. The server as in claim 1, wherein
in a case that a plurality of the association information is present and when common target data is present, the common target data being target data in common for the plurality of target data identified by each of the plurality of association information, the generating of the plurality of target data identification information includes:
  generating one item of integrated association information for integrating the plurality of association information provided with the common target data such that duplicate target data does not exist;
  storing the generated integrated association information in the storage unit; and
  transmitting, via the network interface, the integrated association information to the image processing device,
the executing of the data processing on the target data includes:
  receiving, via the network interface, the plurality of target data identified by the integrated association information transmitted by the image processing device; and
  executing the data processing on the received plurality of target data.

10. The server as in claim 1, wherein
the instructions further cause the server to perform changing, based on changing information, contents of the plurality of target data identification information associated with the one item of association information in response to a reception of the changing information and the one item of association information transmitted by the image processing device via the network interface, during a period in which the data processing is being executed by the executing of the data processing,
  the changing information being for changing association of the plurality of target data identification information with respect to the one item of association information, and
the executing of the data processing includes executing the data processing on the plurality of target data identified by the association information changed by the changing of the contents of the plurality of target data identification information.

11. An image processing device comprising:
a network interface configured to connect with a network; and
a control device coupled to the network interface and configured to perform:
  transmitting, via the network interface, a plurality of target data to a server which is connected with the network, the plurality of target data being data on which data processing is to be executed;
  transmitting, via the network interface to the server, first instruction information for instructing the server to execute:
    generating a plurality of target data identification information for identifying each of the plurality of target data; and
    storing one item of association information corresponding to the plurality of target data identification information in a storage unit provided in the server and transmitting the one item of association information to the image processing device in a case that the target data identification information is generated;
  receiving the one item of association information from the server via the network interface; and
  transmitting, via the network interface to the server, the one item of association information and second instruction information, the second instruction information being for instructing the server to execute the data processing on the target data identified by the target data identification information corresponding to the one item of association information.

12. A system comprising an image processing device and a server,
the image processing device comprising:
  a first network interface configured to connect with a network; and
  a control device coupled to the first network interface,
the server comprising:
  a second network interface configured to connect with the network;
  a processor coupled to the second network interface; and
  a memory storing instructions,
wherein
the control device of the image processing device is configured to perform:
  transmitting a plurality of target data to the server via the first network interface, the plurality of target data being data on which data processing is to be executed; and
  transmitting first instruction information to the server via the first network interface,
the instructions, when executed by the processor of the server, cause the server to perform:
  generating a plurality of target data identification information for identifying each of the plurality of target data; and
  storing one item of association information corresponding to the plurality of target data identification information in a storage unit provided in the server and transmitting the one item of association information to the image processing device via the second network interface in a case that the target data identification information is generated;
the control device of the image processing device is further configured to perform:
  receiving the one item of association information from the server via the first network interface; and
  transmitting, to the server via the first network interface, the one item of association information and second instruction information, the second instruction information being for instructing the server to execute the data processing on the target data identified by the target data identification information corresponding to the one item of association information; and
the instructions, when executed by the processor of the server, further cause the server to perform executing the data processing on the target data identified by the target data identification information corresponding to the one item of association information from among the plurality of target data transmitted from the image processing device, in a case that the one item of association information and the second instruction information is received.

* * * * *